United States Patent [19]

Burke et al.

[11] Patent Number: 4,693,659
[45] Date of Patent: Sep. 15, 1987

[54] DISKETTE TRANSPORT

[75] Inventors: Ken V. Burke, Ben Lomond; Jon V. Jamieson, San Jose; Ernie Keller, Sunnyvale, all of Calif.

[73] Assignee: Mountain Computer, Inc., Scotts Valley, Calif.

[21] Appl. No.: 743,530

[22] Filed: Jun. 11, 1985

Related U.S. Application Data

[63] Continuation of Ser. No. 526,670, Aug. 26, 1983, abandoned.

[51] Int. Cl.4 ............................................. G11B 17/10
[52] U.S. Cl. ..................................... 414/131; 74/582; 192/143; 221/243; 360/98; 414/753

[58] Field of Search ............... 271/143, 131, 269, 299, 271/DIG. 9; 360/91, 97, 98, 99; 414/128, 131, 750, 751, 226, 752, 913, 753; 192/143; 74/582; 318/475

[56] References Cited

U.S. PATENT DOCUMENTS

| | | | |
|---|---|---|---|
| 4,453,188 | 6/1984 | Johnson et al. | 360/98 X |
| 4,510,542 | 4/1985 | Aggeler | 360/98 |
| 4,646,178 | 2/1987 | Garratt et al. | 360/98 |
| 4,654,732 | 3/1987 | Mesher | 360/98 |

*Primary Examiner*—Frank E. Werner
*Assistant Examiner*—Janice Krizek

[57] ABSTRACT

A diskette transport is provided wherein diskettes are withdrawn from the bottom of a stack, transferred to a work station, where the actual duplication or other operation takes place, and withdrawn from the work station and deposited into an appropriate bin, depending on whether the diskette passes or fails some test.

6 Claims, 11 Drawing Figures

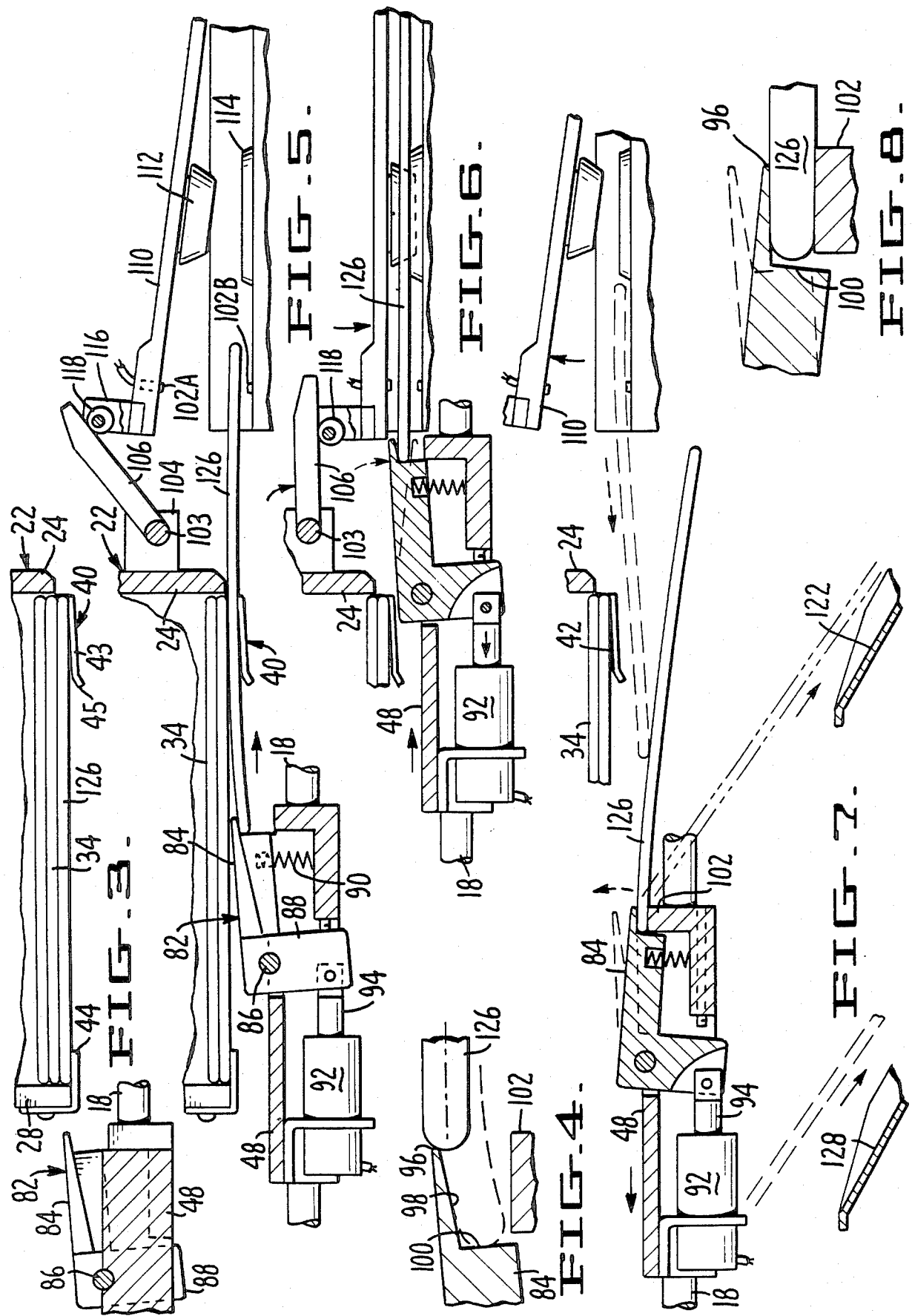

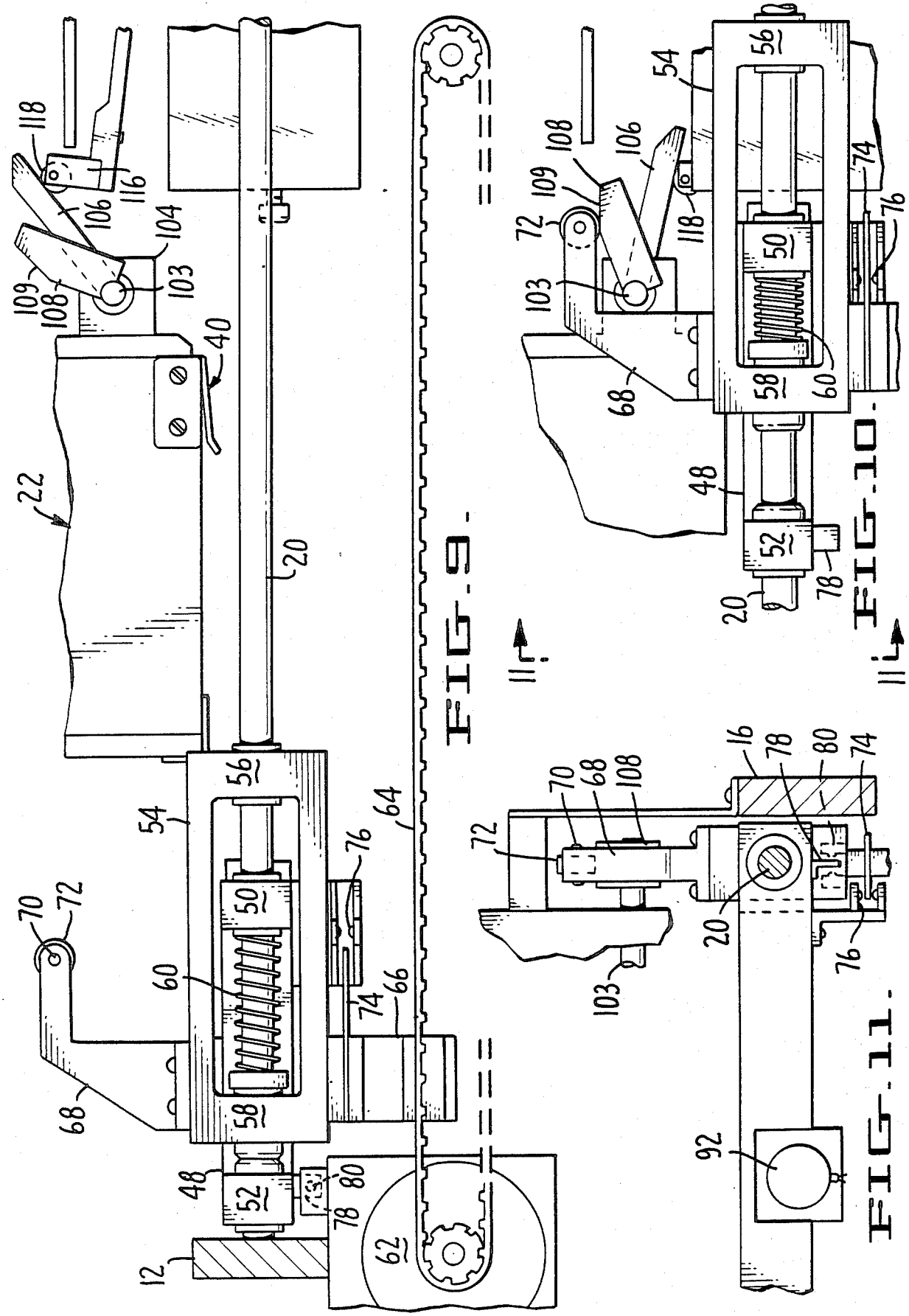

DISKETTE TRANSPORT

This is a continuation of application Ser. No. 526,670, filed Aug. 26, 1983, now abandoned.

SUMMARY OF THE INVENTION

The present invention relates to a simple, inexpensive transport mechanism for floppy diskettes. Primarily the device is utilized for duplication but it may be used for other purposes, such as checking for errors in a disc. The device illustrated is for standard 5¼" floppy diskettes but, of course, it is easily adapted for other sizes.

The mechanical device of the present invention is controlled by a host computer, which also supplies the data to be duplicated or otherwise processed, so that it is not necessary for the user to duplicate existing equipment.

The diskette transport of the present invention operates without supervision so that fifty or more diskettes can be duplicated, checked and placed in an appropriate bin without the attendance of an operator.

Since the device of the present invention is very simple and uses the minimum of moving parts, it is extremely reliable in operation and easy to repair if anything goes wrong. The device has a single motor and one solenoid which control all of the operations.

Because of the simple construction, the device can be produced inexpensively in comparison with competitive devices now on the market.

Many other features and advantages of the invention will be brought out in the balance of the specification.

BRIEF DESCRIPTION OF THE DRAWINGS

FIG. 3 is a section on the line 3—3 of FIG. 2 and is a fragmentary side view showing the position of the parts just before a diskette is to be removed from the bottom of a pile.

FIG. 4 is a fragmentary view, showing the position of the diskette clamp with the diskette in solid lines just prior to being pushed forward and in phantom as it is being pushed forward.

FIG. 5 is a fragmentary side view showing the position of the parts as a diskette is being pushed into the duplicating mechanism.

FIG. 6 is a similar view showing the position of the parts as a diskette is being duplicated.

FIG. 7 shows the position of the parts as a diskette is being withdrawn and deposited in one of two bins.

FIG. 8 is a fragmentary view showing the diskette clamp engaged on a diskette.

FIG. 9 is a side view of the duplicating device.

FIG. 10 is a partial side view showing the action of the door closing mechanism.

FIG. 11 is a section on the line 11—11 of FIG. 10.

DESCRIPTION OF THE PREFERRED EMBODIMENTS

Figure 1:
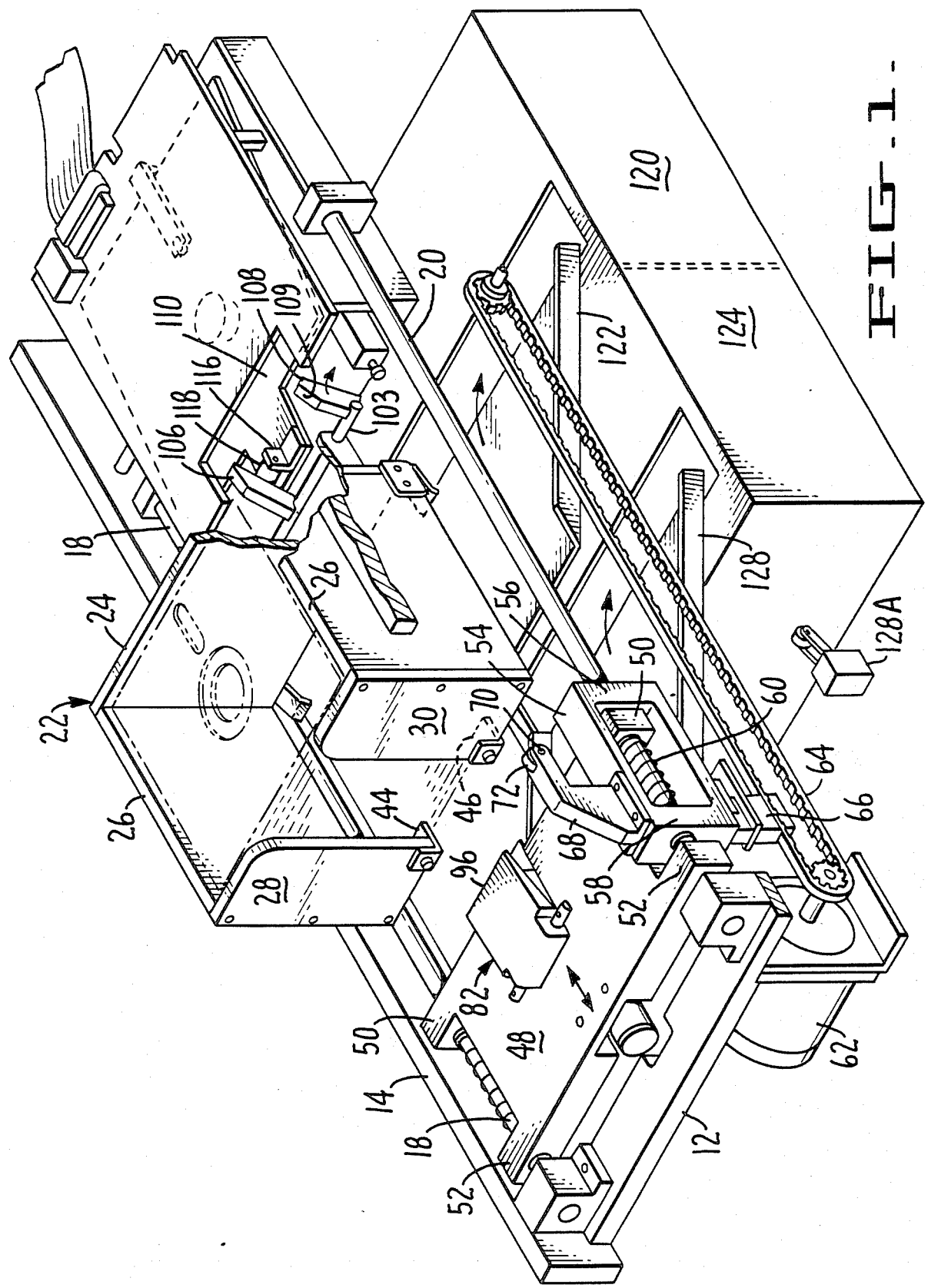
FIG. 1 is a perspective view of a device embodying the present invention.

Referring now to the drawings by reference characters, the device of the present invention includes a frame member 12 having side rails 14 and 16. Mounted on the frame, utilizing suitable support members, are the round guide rails 18 and 20. Mounted near the center of the device is a hopper 22 having an open top and front member 24 and side members 26 and back members 28 and 30 which are spaced apart, leaving an opening to the rear so that it is easy to reach in and place or remove a stack of diskettes from the hopper.

The diskettes themselves are well-known to those skilled in the art and consist of a plastic disc 32 having a coating of magnetic particles thereon encased in an envelope 34 which has a central opening 36 and a read-write slot 38. The floppy disc within its envelope is shown in phantom in FIGS. 1 and 2 and portions of the envelope are shown in solid lines with various other figures.

The bottom of hopper 22 is open and the diskettes are supported on front strippers 40 and 42 and rear fingers 44 and 46. It will be noted that the fingers 44 and 46 are relatively close together compared with the strippers 40 and 42 so that the rear supports 44 and 46 can essentially be considered as a single support. Thus, the diskette is given what amounts to a three-point suspension so that the device will easily handle diskettes which are slightly warped or distorted. The shape of the strippers can best be seen in FIG. 3 wherein the stripper has a relatively long portion 43 inclined at an angle of about 3° from the horizontal, terminating in a tip 45 which is about 10° from horizontal. The function of this particular shape is to prevent the glued flap on a diskette envelope from catching as the diskette is withdrawn from the stack. Thus, when the device is at rest, a stack of diskettes will be supported as is shown in FIG. 3.

A carriage plate 48 is mounted in sliding relationship on the rails 18 and 20 by means of the forward arms 50 and the rear arms 52. Mounted on the rail 20, also in sliding relationship, is the drive yolk 54. The drive yolk has a hollow center with a front member 56 which is mounted forward of the arm 50 and a rear member 58 which is mounted forward of the arm 52. A spring 60 is mounted between the forward arm 50 of the carriage plate and the rear member 58 of the yolk. This provides a lost motion, as is later explained in detail, so that normally as the yolk 54 moves forwardly the motion is transmitted through spring 60, with slight compression, to the carriage plate 48, yet if the carriage plate 48 is stopped, the mechanism does not jam but the spring 60 merely compresses to a greater extent.

Mounted under the frame 12 is a stepping motor 62 which drives a toothed belt or chain 64. Extending downwardly from yolk 54 is chain clamp 66 which connects the chain to the drive yolk and thus permits motor 62 to drive the yolk.

Attached to the top of drive yolk 54 is the door closing actuator 68. As is best seen in FIG. 1, the front end of the actuator 68 is forked and carries a pin 70 to which is attached a ball bearing 72.

Attached to the chain clamp 66 is a finger 74 which is normally held in a position to not intercept a photo-optical pair 76 carried on plate 48 when spring 60 is not unduly compressed. However, should there be a jam in the machine, the lost motion provided between the drive yolk and the carriage plate would cause spring 60 to compress more, thus pushing finger 74 between the elements of optical pair 76 and sending a signal to the computer that the machine was jammed.

A second detector is provided by a finger 78 attached to leg 52 of plate 48. This can pass between the elements of the optical pair 80 attached to frame 12 and signal to the computer that the carriage plate is in home position.

Plate 48 also carries the disc clamp generally designated 82. The disc clamp 82 consists of two main parts, including an upper part 84 which is pivoted on shaft 86 and which has a depending arm 88. The upper member is biased upwardly by means of spring 90 but can be retracted by means of a solenoid 92 attached to plate 48 having a plunger 94 attached to arm 88. The sloping top of the upper member 84 is flat and has a more or less sharp terminal end 96 with a ramp-like underpart 98 leading to an abutment 100. When solenoid 92 is activated, the upper part 84 pivots down and the terminal end 96 is pulled downwardly toward the lower portion of clamp 82, namely anvil 102, as is shown in FIGS. 7 and 8.

At the forward end of hopper 22 is a shaft 103 rotatably mounted on brackets 104. Shaft 103 has two arms attached thereto, namely a door closing arm 106 and an actuating arm 108. The terminal end of arm 108 forms an angle to the balance of the arm providing a second cam surface 109.

Figure 2:
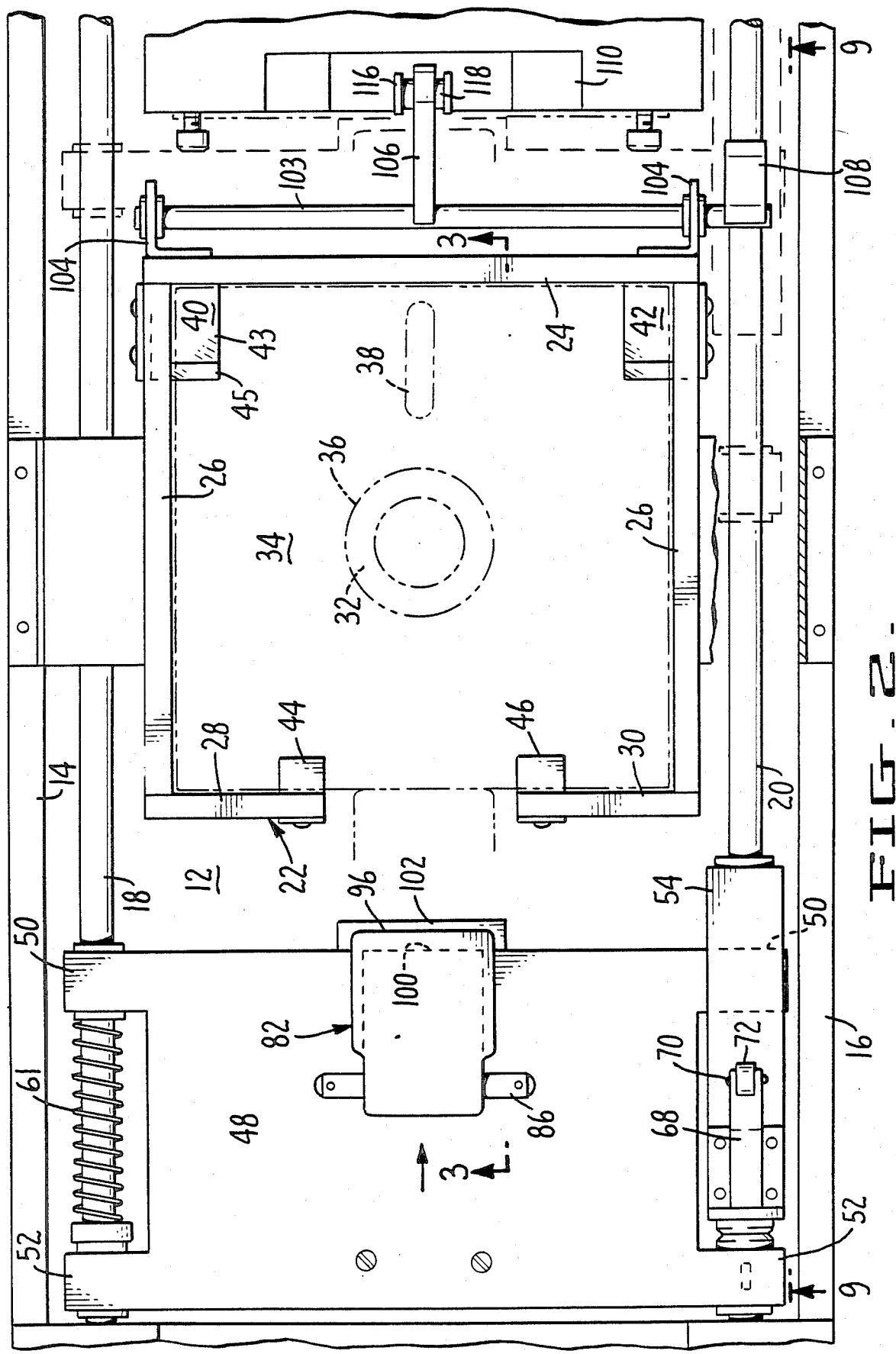
FIG. 2 is a top plan view of the device shown in FIG. 1.

The disc drive mechanism is a standard purchased part well-known to those skilled in the art and therefore will not be described in detail. Suffice it to say that the disc drive has a hinged door 110 normally urged open by a spring, not shown. Attached to door 110 is a spring mounted collet 112 and directly below this is a disc drive hub 114 adapted to be driven by a motor, not illustrated. On the top of door 110 is located a bracket 116 on which is mounted a ball bearing 118 for rotation. This ball bearing is lined up with arm 106 as is best seen in FIG. 2. A third photo-optical pair made up of the elements 102A and 102B are located above and below the position of a disc in operative position, and signal the computer that a disc is in place.

Under the frame of the machine are two bins. Bin 120 has a ramp 122 and bin 124 has a ramp 128. Bin 120 is normally for disks which have been inspected and found good and 124 for those discs which have been inspected and found defective. The bins are removable and a microswitch 128A is employed to tell the computer that the bins are in place and prevent operation without the presence of the bins.

Having described the various parts of the machine, operation of the machine will be described with particular reference to FIGS. 3 through 11. In FIG. 3 the parts are in the position at the start of an operation with a number of diskettes such as the one designated 126 in position within hopper 22 and supported by the elements 42, 44 and 46. Plate 48 is in home position and the position of finger 78 tells the computer that an operation can begin. As the plate 48 moves forward, the sharp end 96 of clamp 82 moves into position just above the centerline of the bottommost diskette 126 as is seen in FIG. 4 in solid lines. Now as the clamp moves farther forward, diskette 126 is pushed off support 44 and pushed through strippers 42 and 43 which allows only one disk to be fed through at a time, as is shown in dashed lines in FIG. 4. The parts are in position as shown in FIG. 5 with the clamp pushing diskette 126 and approaching the position where the diskette is centered between collet 112 and drive hub 114. Now, as plate 48 continues to move forward pushing the diskette ahead, the door closing actuator 68 bears against the actuating arm 108 (see FIG. 10) bringing arm 106 down against the door 110, closing the door and initiating the actual duplicating or other operation wherein data comes from the host computers RAM or disc drive. It will be seen the top portion of the actuating arm 108 designated 109 is flat so that the ball bearing 72 can actually travel some distance over the top of the arm. This merely compresses the spring 60 and permits further motion as required when a disk is to be extracted. Although this compression of the spring 60 places finger 74 within the associated photo-optical pair, the software has deactivated the jam indicator circuit so no jam is indicated to the computer.

When the operation is complete, the solenoid 92 is activated, causing clamp 84 to move down and grip the diskette, as is shown in phantom in FIG. 6 and in solid lines in FIG. 8. As drive yolk 54 moves back, bearing 72 moves off of arm 108 allowing cover 110 to rise as is shown in FIG. 7. As drive yolk 54 moves back, plate 48 cannot immediately follow since the clamp is gripping a diskette engaged between the collet 112 and drive 114 so that the spring 60 starts to decompress. Bearing 72 now moves off of arm 108 allowing cover 110 to rise as is shown in FIG. 7. Now plate 48 can follow yolk 54, withdrawing the diskette. As drive yolk 54 moves back, solenoid 92 will be deactivated at the proper time so that a diskette if good will be released upon ramp 122 as is shown in dot dashed lines or if bad against ramp 128 as shown in dashed lines.

The parts are now in position for a repetition of the operation as soon as plate 48 fully retracts to the home position and the sensor 80 gives the computer the signal that a new operation can commence.

Although a specific embodiment of the invention has been illustrated, it will be understood that many variations can be made without departing from the spirit of this invention.

We claim:

1. An apparatus for singulating and feeding diskettes one at a time from a stack and transporting each diskette to a disk drive station, said apppartus comprising:
    means for supporting the plurality of diskettes in a vertical stack including a hopper,
    means for pushing the bottommost diskette in the stack from beneath the stack including a pair of spaced rails disposed beneath said hopper, a carriage plate mounted for travel along said rails, means mounted to said carriage plate for separating the bottommost diskette from the stack and pushing said diskette from under the stack as the carriage plate moves beneath the stack along said rails, a chain drive extending in a direction parallel to said rails, said carriage plate being operatively connected to said chain drive, means for operating said chain drive and moving said carriage plate along said rails, and further comprising a lost motion connection including a spring operatively connected between said carriage plate and said chain drive, said spring allowing said chain drive to operate without advancing said carriage plate if carriage plate movement is obstructed.

2. The apparatus of claim 1, said lost motion connection comprising a drive yolk slidably mounted on one of said rails, means connecting said drive yoke to said chain drive, said spring being a helical coil disposed intermediate said yoke and carriage plate, whereby said helical coil is compressed between said drive yoke and said carriage plate if carriage plate movement is obstructed.

3. The apparatus of claim 1, and further comprising means for detecting and indicating a carriage plate obstruction when said spring is compressed a predetermined amount.

4. The apparatus of claim 1, and further comprising means for indicating when the carriage plate occupies a home position.

5. The apparatus of claim 1 and further comprising a removable bin located beneath and horizontally intermediate said hopper and the disk drive station, and means for detecting the presence of said bin.

6. The apparatus of claim 1, and further comprising a disc drive mechanism having a hinged door that is normally biased open, and means carried by said carriage plate for closing said hinged door after a diskette is positioned within said mechanism.

* * * * *